United States Patent
Oh et al.

(10) Patent No.: US 11,887,789 B2
(45) Date of Patent: Jan. 30, 2024

(54) MULTILAYER ELECTRONIC COMPONENT

(71) Applicant: SAMSUNG ELECTRO-MECHANICS CO., LTD., Suwon-si (KR)

(72) Inventors: Won Kuen Oh, Suwon-si (KR); Gyu Ho Yeon, Suwon-si (KR); Seo Won Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/725,105

(22) Filed: Apr. 20, 2022

(65) Prior Publication Data

US 2023/0207205 A1 Jun. 29, 2023

(30) Foreign Application Priority Data

Dec. 24, 2021 (KR) .................. 10-2021-0187059

(51) Int. Cl.
*H01G 4/232* (2006.01)
*H01G 2/06* (2006.01)
*H01G 4/30* (2006.01)

(52) U.S. Cl.
CPC ........... *H01G 4/2325* (2013.01); *H01G 2/065* (2013.01); *H01G 4/30* (2013.01)

(58) Field of Classification Search
CPC ........ H01G 4/065; H01G 4/33; H01G 4/2325; H01G 4/30; B22F 1/103; B22F 1/17; B22F 2304/10; C22C 9/06; H01B 1/22
See application file for complete search history.

(56) References Cited

U.S. PATENT DOCUMENTS

| 4,753,855 | A | * | 6/1988 | Haluska | ............... | H01L 23/291 |
| | | | | | | 427/249.15 |
| 5,712,758 | A | * | 1/1998 | Amano | ............... | H01G 4/2325 |
| | | | | | | 361/306.3 |
| 10,825,611 | B1 | | 11/2020 | Fukuoka et al. | | |
| 2001/0043454 | A1 | | 11/2001 | Yoshii et al. | | |

(Continued)

FOREIGN PATENT DOCUMENTS

| JP | 2001-307947 A | 11/2001 |
| JP | 2021-019010 A | 2/2021 |

*Primary Examiner* — Michael P McFadden
(74) *Attorney, Agent, or Firm* — MORGAN, LEWIS & BOCKIUS LLP

(57) ABSTRACT

A multilayer electronic component includes: a body including a dielectric layer, first and second internal electrodes, alternately disposed with the dielectric layer interposed therebetween, first and second surfaces opposing each other in a first direction, third and fourth surfaces connected to the first and second surfaces and opposing each other in a second direction; and an external electrode disposed on the third or fourth surface of the body. The external electrode includes first electrode layers connected to the internal electrodes and containing copper (Cu), second electrode layers, disposed on the first electrode layers, contain copper (Cu) and silver (Ag), and further contain at least one of palladium (Pd), platinum (Pt), and gold (Au), and third electrode layers that are disposed on the second electrode layers and contain silver (Ag), and an average thickness of the third electrode layers may be 3 μm or more and 15 μm or less.

21 Claims, 5 Drawing Sheets

(56) References Cited

U.S. PATENT DOCUMENTS

| | | | | |
|---|---|---|---|---|
| 2006/0145401 A1* | 7/2006 | Mihara | .................. | H01G 4/232 |
| | | | | 264/618 |
| 2009/0310276 A1* | 12/2009 | Tashima | ................... | H01G 4/30 |
| | | | | 29/25.42 |
| 2017/0330689 A1* | 11/2017 | Hatanaka | ............... | H01G 2/065 |
| 2021/0366654 A1* | 11/2021 | Iguchi | ................... | H01G 4/232 |
| 2022/0122776 A1* | 4/2022 | Iguchi | ...................... | H01G 4/30 |

\* cited by examiner

MULTILAYER ELECTRONIC COMPONENT

CROSS-REFERENCE TO RELATED APPLICATION(S)

This application claims benefit of priority to Korean Patent Application No. 10-2021-0187059 filed on Dec. 24, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC) as one of multilayer electronic components is an important chip component used in industries such as the communications, computing, home appliance, and automobile industries due to their small size and high capacity, and in particular, is a key passive element used in various electrical, electronic, and information communication devices such as mobile phones, computers, and digital TVs.

Conventionally, in order to mount the multilayer ceramic capacitor on a substrate or the like, an external electrode of the multilayer ceramic capacitor may include a plating layer formed on an electrode layer. However, during mounting due to a high temperature environment, solder cracks may occur or contact resistance may increase due to warpage of the substrate and oxidation of tin (Sn) contained in the plating layer.

In order to solve this problem, an external electrode structure including a first electrode layer containing copper (Cu) and a second electrode layer formed of an electrode containing silver (Ag) and palladium (Pd) is used. When such an external electrode is used, the multilayer ceramic capacitor may be mounted on the substrate using Ag epoxy as conductive glue instead of tin soldering.

However, in the case of such an external electrode structure, copper may be exposed to a surface of the external electrode and oxidized in a high temperature and high humidity environment, and thus, adhesion may be reduced in a state in which the multilayer electronic component is mounted on the substrate.

SUMMARY

An aspect of the present disclosure may suppress a phenomenon in which Cu is exposed and oxidized on an outer surface of a second electrode layer when a first electrode layer constituting an external electrode contains Cu and the second electrode layer contains Ag and Pd.

An aspect of the present disclosure may also solve the problem that ion migration occurs when a third electrode layer formed of Ag is formed on an outer surface of a second electrode layer to suppress a phenomenon in which Cu is exposed and oxidized.

However, the objects of the present disclosure are not limited to the above description, and may be more easily understood in the course of describing the specific exemplary embodiments of the present disclosure.

According to an aspect of the present disclosure, a multilayer electronic component may include: a body including a dielectric layer, first and second internal electrodes, alternately disposed with the dielectric layer interposed therebetween, first and second surfaces opposing each other in a first direction, third and fourth surfaces connected to the first and second surfaces and opposing each other in a second direction, and fifth and sixth surfaces connected to the first to fourth surfaces and opposing each other in a third direction; and an external electrode disposed on the third or fourth surface of the body, in which the external electrode includes first electrode layers connected to the internal electrodes and containing copper (Cu), second electrode layers, disposed on the first electrode layers, contain copper (Cu) and silver (Ag), and further contain at least one of palladium (Pd), platinum (Pt), and gold (Au), and third electrode layers that are disposed on the second electrode layers and contain silver (Ag), and an average thickness of the third electrode layers may be 3 μm or more and 15 μm or less.

According to another aspect of the present disclosure, a multilayer electronic component may include: a body including a dielectric layer, first and second internal electrodes, alternately disposed with the dielectric layer interposed therebetween; and an external electrode disposed on a surface of the body, in which the external electrode includes a first electrode connected to the internal electrodes and containing copper (Cu), a second electrode layer, disposed on the first electrode layer and containing silver (Ag), and a third electrode layer disposed on the second electrode layer and containing silver (Ag), and an average thickness of the third electrode layer is 3 μm or more and 15 μm or less.

According to another aspect of the present disclosure, a component may include: a substrate, and the multilayer electronic component disclosed herein mounted on the substrate.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
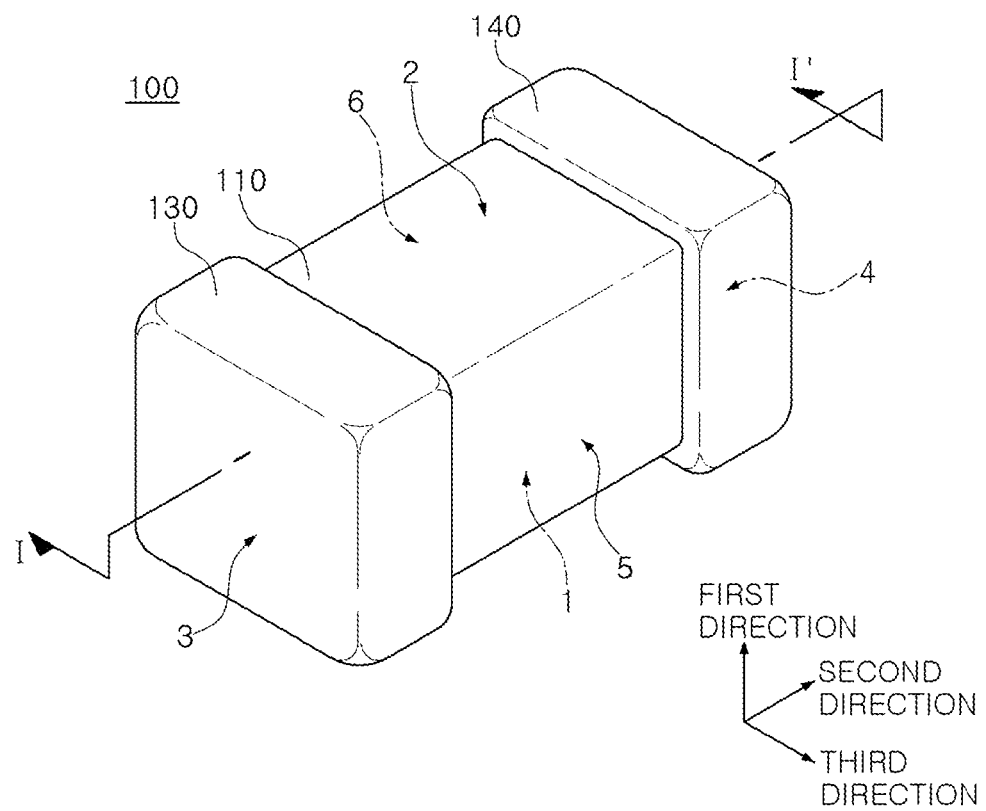
FIG. 1 is a diagram schematically illustrating a perspective view of a multilayer electronic component according to an exemplary embodiment.

Hereinafter, exemplary embodiments will be described in detail with reference to the accompanying drawings. However, exemplary embodiments may be modified in various other forms, and the scope of the present disclosure is not limited to exemplary embodiments to be described below. Further, exemplary embodiments are provided in order to more completely explain the present disclosure to those skilled in the art. In the drawings, the shapes and dimensions may be exaggerated for clarity, and the same reference numerals will be used throughout to designate the same or like components.

In order to clearly explain the present disclosure, parts irrelevant to the description will be omitted in the drawings, and sizes and thicknesses of each component illustrated in the drawings are arbitrarily indicated for convenience of description, and therefore, the present disclosure is not necessarily limited to those illustrated. Further, like reference numerals will be used to designate like components having similar functions throughout the drawings within the scope of the present disclosure. Furthermore, throughout the present specification, unless explicitly described to the contrary, "comprising" any components will be understood to imply the inclusion of other elements rather than the exclusion of any other elements.

In the drawings, a first direction may be defined as a stacking direction or a thickness (T) direction, a second direction may be defined as a length (L) direction, and a third direction may be defined as a width (W) direction.

FIG. 1 is a diagram schematically illustrating a perspective view of a multilayer electronic component according to an exemplary embodiment.

Figure 2:
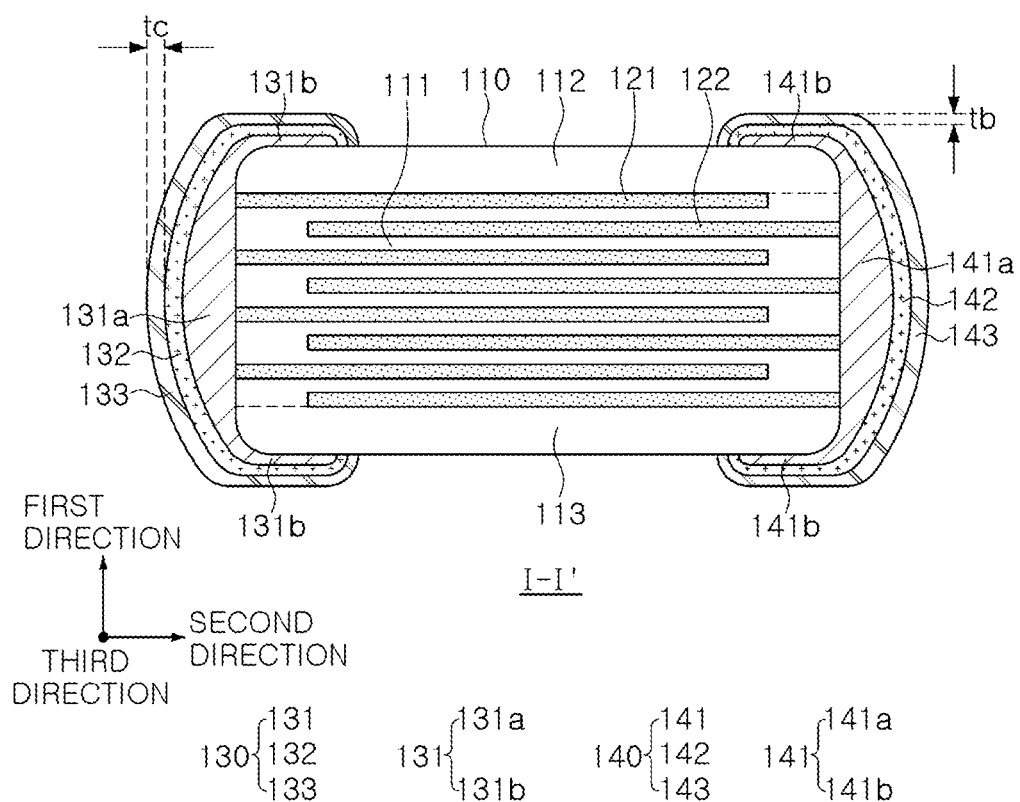
FIG. 2 is a cross-sectional view taken along line I-I' of FIG. 1.

FIG. 2 is a cross-sectional view taken along line I-I' of FIG. 1.

Figure 3:
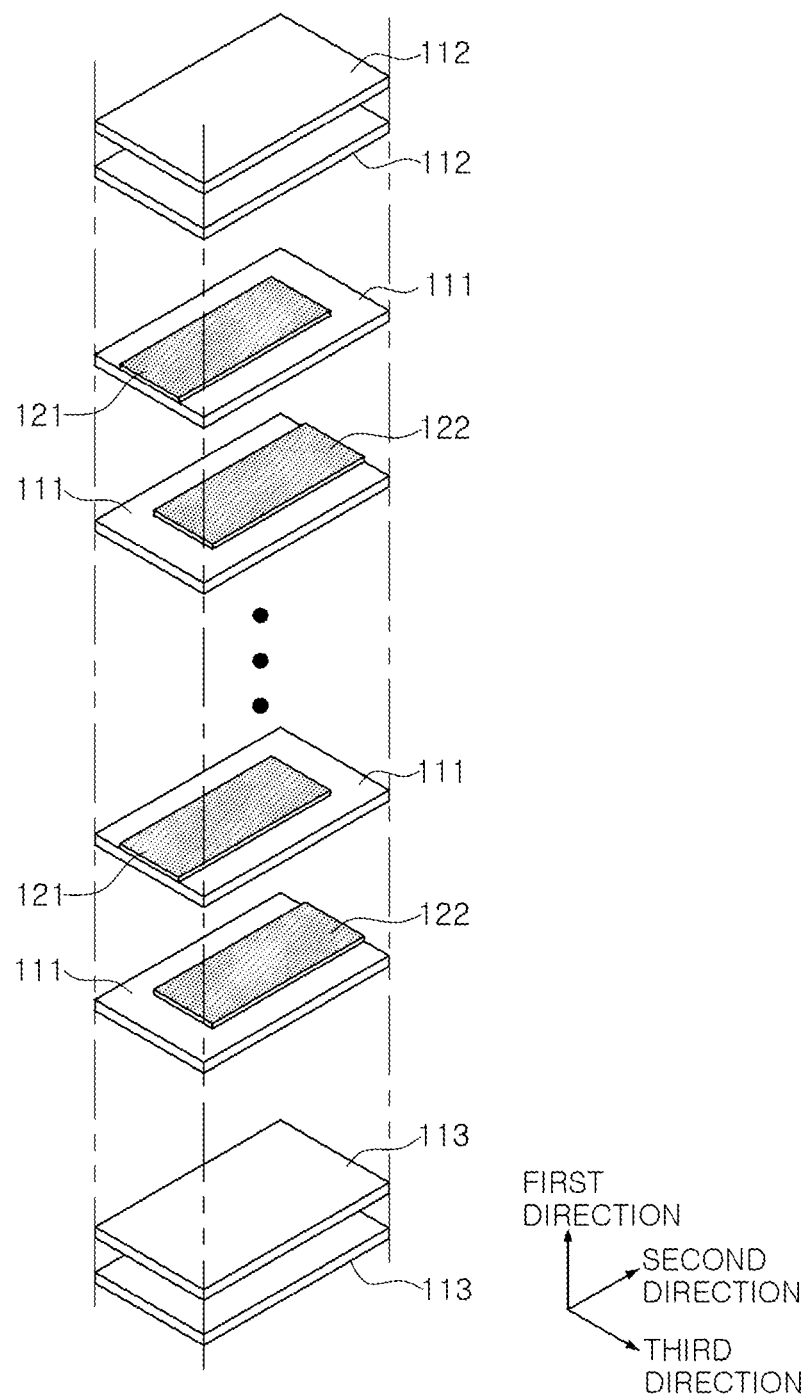
FIG. 3 is an exploded perspective view schematically illustrating a body in which a dielectric layer and internal electrodes are stacked according to an exemplary embodiment.

FIG. 3 is an exploded perspective view schematically illustrating a body in which a dielectric layer and internal electrodes are stacked according to an exemplary embodiment.

Hereinafter, a multilayer electronic component 100 according to an exemplary embodiment will be described with reference to FIGS. 1 to 3.

The multilayer electronic component 100 according to an exemplary embodiment may include a body 110 including a dielectric layer 111, first and second internal electrodes 121 and 122 that are alternately disposed with the dielectric layer interposed therebetween, first and second surfaces 1 and 2 opposing each other in a first direction, third and fourth surfaces 3 and 4 connected to the first and second surfaces and opposing each other in a second direction, and fifth and sixth surfaces 5 and 6 connected to the first to fourth surfaces and opposing each other in a third direction, and external electrodes 130 and 140 that are disposed on the third or fourth surface of the body, in which the external electrode includes first electrode layers 131 and 141 connected to the internal electrodes and containing copper (Cu), second electrode layers 132 and 142, disposed on the first electrode layers, contain copper (Cu) and silver (Ag), and further contain at least one of palladium (Pd), platinum (Pt), and gold (Au), and third electrode layers 133 and 143, disposed on the second electrode layers and containing silver (Ag), and an average thickness of the third electrode layers may be 3 μm or more and 15 μm or less.

The body 110 may include the dielectric layer 111 and the internal electrodes 121 and 122 alternately stacked therein.

A specific shape of the body 110 may not be particularly limited, but may be a hexahedral shape or a shape similar to the hexahedral shape, as illustrated in FIG. 1. Although the body 110 does not have a hexahedral shape having perfectly straight lines due to shrinkage of ceramic powders included in the body 110 in a sintering process, the body 110 may substantially have the hexahedral shape.

The body 110 may have the first and second surfaces 1 and 2 opposing each other in the first direction (thickness direction), the third and fourth surfaces 3 and 4 connected to the first and second surfaces 1 and 2 and opposing each other in the second direction (length direction), and the fifth and sixth surfaces 5 and 6 connected to the first and second surfaces 1 and 2, connected to the third and fourth surfaces 3 and 4, and opposing each other in the third direction (width direction).

The plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment, a raw material for forming the dielectric layer 111 may not be particularly limited as long as sufficient capacitance may be obtained. For example, a barium titanate-based material, a lead composite perovskite-based material, a strontium titanate-based material, or the like may be used. The barium titanate-based material may include $BaTiO_3$-based ceramic powder, and examples of the ceramic powder may include $BaTiO_3$, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which calcium (Ca), zirconium (Zr), or the like, is partially dissolved in the $BaTiO_3$, or the like.

In addition, a raw material of the dielectric layer 111 may be prepared by adding various ceramic additives, organic solvents, binders, dispersants, and the like, to powders such as the barium titanate ($BaTiO_3$) powder, according to an object of the present disclosure.

The body 110 may include a capacitance forming part that forms capacitance, including the first and second internal electrodes 121 and 122 that are disposed in the body 110 and are disposed to opposing each other with the dielectric layer 111 interposed therebetween, and cover parts 112 and 113 that are disposed above and below the capacitance forming part.

The capacitance forming part is a part that contributes to the formation of capacitance of a capacitor and may be formed by repeatedly stacking the plurality of first and second internal electrodes 121 and 122 with the dielectric layer 111 interposed therebetween.

The upper cover part 112 and the lower cover part 113 may be formed by stacking a single dielectric layer or two or more dielectric layers on upper and lower surfaces of the capacitance forming part, respectively, in a vertical direction, and may basically serve to prevent damage to the internal electrodes due to physical or chemical stress.

The upper cover part 112 and the lower cover part 113 do not include the internal electrode and may include the same material as the dielectric layer 111.

The internal electrodes 121 and 122 may be disposed to face each other with the dielectric layer 111 interposed therebetween.

The internal electrodes 121 and 122 may include the first and second internal electrodes 121 and 122 alternately disposed to opposing each other with the dielectric layer interposed therebetween.

The first and second internal electrodes 121 and 122 may be exposed to the third and fourth surfaces 3 and 4 of the body 110, respectively.

Referring to FIG. 2, the first internal electrode 121 may be spaced apart from the fourth surface 4 and exposed through the third surface 3, and the second internal electrode 122 may be spaced apart from the third surface 3 and exposed through the fourth surface 4. The first external electrode 130 may be disposed on the third surface 3 of the body and connected to the first internal electrode 121, and the second external electrode 140 may be disposed on the fourth surface 4 of the body and connected to the second internal electrode 122.

That is, the first internal electrode 121 may not be connected to the second external electrode 140, but may be connected to the first external electrode 130, and the second internal electrode 122 may not be connected to the first external electrode 130 and may be connected to the second external electrode 140. Accordingly, the first internal electrode 121 may be formed to be spaced apart from the fourth surface 4 by a predetermined distance, and the second internal electrode 122 may be formed to be spaced apart from the third surface 3 by a predetermined distance.

The first and second internal electrodes 121 and 122 may be electrically isolated from each other by the dielectric layer 111 interposed therebetween.

Referring to FIG. 3, the body 110 may be formed by alternately stacking the dielectric layer 111 on which the first internal electrode 121 is printed and the dielectric layer 111 on which the second internal electrode 122 is printed in the thickness direction (first direction) and then sintering the dielectric layer 111.

The material for forming the internal electrodes 121 and 122 may not be particularly limited, and a material having excellent electrical conductivity may be used. For example, the internal electrodes 121 and 122 may be formed by printing, on a ceramic green sheet, a conductive paste for the internal electrode that contains at least one of nickel (Ni), copper (Cu), palladium (Pd), silver (Ag), gold (Au), platinum (Pt), tin (Sn), tungsten (W), titanium (Ti), and alloys thereof.

A method of printing the conductive paste for the internal electrode may be a screen printing method, a gravure printing method, or the like, but the present disclosure is not limited thereto.

The external electrodes 130 and 140 are disposed on the body 110, and may include the first electrode layers 131 and 141, the second electrode layers 132 and 142, and the third electrode layers 133 and 143.

The external electrodes 130 and 140 may include the first and second external electrodes 130 and 140 connected to the first and second internal electrodes 121 and 122, respectively.

That is, the first and second external electrodes 130 and 140 may each include the first electrode layers 131 and 141, the second electrode layers 132 and 142, and the third electrode layers 133 and 143.

The first electrode layers 131 and 141 according to the exemplary embodiment may contain copper (Cu), and serve to mechanically couple the body 110 and the external electrodes 130 and 140 and electrically connect the internal electrodes and the external electrodes.

When the first electrode layers 131 and 141 contain copper (Cu), the first electrode layers 131 and 141 come into contact with palladium (Pd) of the second electrode layers to be described later through mutual diffusion to form a Cu—Pd alloy or an intermetallic compound (IMC), so adhesion between the first electrode layers 131 and 141 and the second electrode layers 132 and 142 may increase. In addition, copper (Cu) may be easily diffused in the direction of the internal electrodes 121 and 122 containing nickel (Ni) to form a Cu—Ni alloy, so the adhesion between the internal electrodes 121 and 122 and the first electrode layers 131 and 141 may increase and electrical connectivity may increase to reduce an erythrocyte sedimentation rate (ESR).

The first electrode layers 131 and 141 may come into direct contact with the first and second internal electrodes 121 and 122 alternately exposed through one surface of the body 110 in the second direction, so electrical conduction between the first and second external electrodes 130 and 140 and the first and second internal electrodes 121 and 122 may be secured.

Meanwhile, thicknesses of first electrode layers 131*a* and 132*a* do not need to be particularly limited, but the first electrode layers 131*a* and 132*a* may be formed to have a constant thickness in order to maintain the mechanical strength of the multilayer electronic component 100 and secure the electrical connectivity.

In this case, the first electrode layers 131 and 141 may extend from the third and fourth surfaces 3 and 4 of the body 110 to a part of the first and second surfaces 1 and 2 of the body 110, respectively. Accordingly, the first electrode layers 131 and 141 may include connection portions 131*a* and 141*a* disposed on the third and fourth surfaces 3 and 4 of the body 110, and band portions 131*b* and 141*b* extending from the connection portion to a part of the first and second surfaces 1 and 2 of the body 110.

In addition, the first electrode layers 131 and 141 may extend to a part of the fifth and sixth surfaces 5 and 6 of the body 110, respectively. Accordingly, the first electrode layers 131 and 141 may include a side band portion extending from the connection portion to a part of the fifth and sixth surfaces of the body 110.

The first electrode layers 131 and 141 may be formed by a method of applying a conductive paste prepared by adding a glass frit to the conductive metal powder to the surface of the body 110 and then firing the conductive paste, or a method of transferring a sheet containing a conductive metal to the surface of the body 110, but may be formed without being limited thereto, and the first electrode layers 131 and 141 may be formed using an atomic layer deposition (ALD) method, a molecular layer deposition (MLD) method, a chemical vapor deposition (CVD) method, a sputtering method, or the like.

The second electrode layers 132 and 142 may be disposed on the first electrode layers, contain copper (Cu) and silver (Ag), and contain noble metals of at least one of palladium (Pd), platinum (Pt), and gold (Au).

The second electrode layers 132 and 142 may be electrically connected to the first electrode layers 131 and 141, and the multilayer electronic component 100 may be mounted on a substrate without soldering containing tin (Sn) by applying a conductive adhesive containing silver (Ag) and an epoxy resin to the external electrodes 130 and 140. Accordingly, the stability of the multilayer electronic component 100 may be secured by preventing warpage of the substrate during mounting and mounting the substrate at a low temperature.

The second electrode layers 132 and 142 may contain silver (Ag) because the second electrode layers 132 and 142 need to be bonded to the conductive adhesive containing silver (Ag). However, when the content of silver (Ag) of the second electrode layer is increased, or when silver (Ag) is used alone, an ion migration phenomenon may occur in the high temperature environment. Accordingly, the second electrode layer of the multilayer electronic component 100 according to the exemplary embodiment may further contain one or more noble metals among palladium (Pd), platinum (Pt), and gold (Au), thereby preventing the ion migration phenomenon in the high temperature environment.

Accordingly, in an exemplary embodiment, the second electrode layers 134 and 142 may contain copper (Cu), silver (Ag), and palladium (Pd), and the palladium (Pd) may be replaced by platinum (Pt) or gold (Au).

The second electrode layers 132 and 142 may further include glass. The glass may serve to control a sintering rate of silver (Ag) and palladium (Pd) metals when forming the second electrode layers 132 and 142 by applying and firing the paste, and to secure the adhesion to the substrate.

The glass component may be a composition in which oxides are mixed, and may not be particularly limited, but may be one or more selected from the group consisting of a silicon oxide, a boron oxide, an aluminum oxide, a transition metal oxide, an alkali metal oxide, and an alkaline earth metal oxide. The transition metal may be selected from the group consisting of zinc (Zn), titanium (Ti), vanadium (V), manganese (Mn), iron (Fe), and nickel (Ni), the alkali metal may be selected from the group consisting of lithium (Li), sodium (Na), and potassium (K), and the alkaline earth metal may be at least one selected from the group consisting of magnesium (Mg), calcium (Ca), strontium (Sr), and barium (Ba). In some embodiments, the second electrode layer may not contain nickel (Ni), as determined by, for example, a scanning electron microscopy-energy dispersive spectrometer (SEM-EDS).

Meanwhile, the copper (Cu) contained in the second electrode layers 132 and 142 may be formed by containing copper in the conductive paste included when the second electrode layer is formed, and may be formed by being diffused from the first electrode layers 131 and 141 to the second electrode layers 132 and 142 in the process of applying the conductive paste containing silver (Ag) and palladium (Pd) to the first electrode layers 131 and 141 containing the copper (Cu) and then firing the conductive paste.

Since the second electrode layers 132 and 142 contain copper (Cu) and silver (Ag) and contain at least one noble metal of palladium (Pd), platinum (Pt), and gold (Au), the diffusion of copper (Cu) contained in the first and second electrode layers 131, 141, 132, and 142 to the outer surface of the second electrode layer may be greater than when the second electrode layer is formed of silver (Ag) alone. Accordingly, the copper (Cu) contained in the first and second electrode layers may be exposed to the outer surfaces of the second electrode layers 132 and 142.

When copper (Cu) is exposed to the outer surfaces of the second electrode layers 132 and 142, the copper (Cu) may be easily oxidized in a high temperature and high humidity environment, and the outer surfaces of the second electrode layer may contain an oxide containing the copper (Cu). Accordingly, when the multilayer electronic component 100 is mounted on the substrate using a conductive adhesive containing silver (Ag) and an epoxy resin, the adhesion strength may be weakened.

Accordingly, the structure of the external electrodes 130 and 140 is required to prevent the phenomenon in which the copper (Cu) is exposed to the outer surfaces of the second electrode layers 132 and 142 and oxidized.

The external electrodes 130 and 140 of the multilayer electronic component 100 according to the exemplary embodiment may be disposed on the second electrode layers 132 and 142 and may include the third electrode layers 133 and 143 containing silver (Ag).

Since the third electrode layers 133 and 143 contain silver (Ag), it is possible to suppress the phenomenon in which copper (Cu) is exposed to the outer surfaces of the external electrodes 130 and 140 and oxidized.

However, even if the third electrode layers 133 and 143 simply contain silver (Ag), it is not possible to prevent copper (Cu) from being exposed to the outer surfaces of the external electrodes 130 and 140.

When the average thickness of the third electrode layers 133 and 143 is less than 3 μm, copper may be diffused to the outer surfaces of the third electrode layers 133 and 143 through the second electrode layers 132 and 142 and exposed to the outside, and thus, the oxide containing copper may be formed on the outer surfaces of the external electrodes 130 and 140, so the adhesion strength may still be weakened. In addition, when the oxide containing copper is formed on the outer surfaces of the external electrodes 130 and 140, the electrical connectivity may deteriorate, so an equivalent series resistance (ESR) may increase.

Accordingly, by setting the average thickness of the third electrode layers 133 and 143 of the multilayer electronic component 100 according to the exemplary embodiment to 3 μm or more, copper may be prevented from being exposed to the outer surfaces of the third electrode layers 133 and 143 even when the copper is diffused in the first and second electrode layers 131, 141, 132, and 142, to thereby suppress the weakening of the adhesion strength of the multilayer electronic component 100 due to the formation of the oxide containing copper on the outer surfaces of the external electrodes 130 and 140, and suppress the phenomenon in which the ESR increases by securing the electrical connectivity.

Meanwhile, the upper limit of the average thickness of the third electrode layers 133 and 143 may not be particularly limited. However, when the average thickness of the third electrode layers 133 and 143 exceeds 15 μm, the volume occupied by the external electrodes 130 and 140 in the multilayer electronic component 100 may increase, so it may be difficult to increase the capacitance forming part included in the body 110. That is, it may be difficult to design a high-capacity multilayer electronic component 100.

Therefore, according to the exemplary embodiment, by controlling the average thickness of the third electrode layers 133 and 143 to 3 μm or more and 15 μm or less, it is easy to design the high-capacity multilayer electronic component 100, and it is possible to increase the adhesion strength of the multilayer electronic component 100 and secure the excellent ESR characteristics, and by making the external electrodes 130 and 140 thin, it is possible to miniaturize the multilayer electronic component 100.

Meanwhile, when the average thickness of the third electrode layers 133 and 143 is 3 μm or more, it is possible to prevent the phenomenon in which the copper is exposed to the outer surfaces of the external electrodes 130 and 140. Accordingly, in an exemplary embodiment, the outer surfaces of the third electrode layers 133 and 143 or the outer surfaces of the external electrodes 130 and 140 may not contain copper (Cu).

The average thickness of the third electrode layers 133 and 143 may be a value obtained by averaging sizes in the second direction measured at five points at equal intervals on the third electrode layer disposed on the third or fourth surface of the body 110.

Meanwhile, an average thickness tc of the third electrode layers 133 and 143 disposed on the connection portions 131a and 141a and an average thickness tb of the third electrode layers 133 and 143 disposed on the band portions 131b and 141b may differ depending on the method of forming the third electrode layers 133 and 143 and the purpose of the multilayer electronic component 100.

In an exemplary embodiment, the average thickness tc of the third electrode layers 133 and 143 disposed on the connection portions 131a and 141a may be greater than the average thickness tb of the third electrode layers 133 and 143 disposed on the band portions 131b and 141b.

Accordingly, by increasing a contact area with the conductive adhesive containing silver (Ag) and an epoxy resin contacting the external electrodes 130 and 140 while reducing the size of the external electrodes 130 and 140 in the first direction, it is possible to increase the adhesion strength when the multilayer electronic component 100 is mounted on the substrate.

In this case, the average thickness tc of the third electrode layers 133 and 143 disposed on the connection portions 131a and 141a may be a value obtained by averaging the sizes in the second direction measured at five points at equal intervals on the third electrode layers 133 and 143 disposed on the third or fourth surface of the body 110, and the average thickness tb of the third electrode layers 133 and 143 disposed on the band portions 131b and 141b may be a value obtained by averaging the sizes in the first direction measured at five points at equal intervals on the third electrode layers 133 and 143 disposed on the first or second surfaces 1 and 2 of the body 110.

Meanwhile, the first to third electrode layers may cut the multilayer electronic component 100 in the first and second directions (length-thickness) so that the areas in which the external electrodes 130 and 140 are formed may be divided through component analysis using scanning electron microscopy-energy dispersive spectrometer (SEM-EDS). As a specific example, a layer containing Cu without containing noble metals such as Pd, Pt, and Au as a metal component may be divided as the first electrode layers 131 and 141, a layer containing Cu and Ag and further containing noble metals such as Pd, Pt, and Au may be divided as the second electrode layers 132 and 142, and a layer containing only an Ag component without other metal components may be divided into the third electrode layers 133 and 143.

The method of forming the third electrode layers 133 and 143 containing silver (Ag) on the second electrode layers 132 and 142 may not be particularly limited.

For example, the third electrode layers 133 and 143 may be formed by applying a conductive paste, which is prepared by adding a glass frit to conductive metal powder containing silver (Ag), to the second electrode layers 132 and 142 and then firing the conductive paste. In this case, the fired third electrode layers 133 and 143 may further include glass.

In this case, the number of moles of silver (Ag) element to the total number of moles of elements constituting the third electrode layer excluding the glass may be 0.95 or more. That is, the third electrode layers 133 and 143 may be substantially formed of silver (Ag) except for impurities and glass. Accordingly, it is possible to further suppress the phenomenon in which copper is exposed to the surfaces of the external electrodes 130 and 140 and oxidized.

In addition, the third electrode layers 133 and 143 may also be formed by the atomic layer deposition (ALD) method, the molecular layer deposition (MLD) method, the chemical vapor deposition (CVD) method, the sputtering method, or the like. In this case, the third electrode layers 133 and 143 may not include glass.

In this case, the number of moles of silver (Ag) element to the total number of moles of elements constituting the third electrode layer may be 0.95 or more. That is, the third electrode layers 133 and 143 may be substantially formed of silver (Ag) except for impurities. Accordingly, it is possible to further suppress the phenomenon in which copper is exposed to the surfaces of the external electrodes 130 and 140 and oxidized.

The number of moles of silver (Ag) element to the total number of moles of elements constituting the third electrode layer may be determined by methods known to one of ordinary skill in the art. For example, such methods may include using a scanning electron microscopy-energy dispersive spectrometer (SEM-EDS) to determine the number of moles of each element present in the third electrode layer and then calculating the number of moles of silver (Ag) element to the total number of moles of elements constituting the third electrode layer.

In an exemplary embodiment, the second and third electrode layers 132, 142, 133, and 143 may be disposed on the connection portions 131a and 141a, and extend to the band portions 131b and 141b to cover all the band portions 131b and 141b. Accordingly, the airtightness of the multilayer electronic component 100 may increase, and since the third electrode layers 133 and 143 containing silver (Ag) are also disposed on the band portion, it is possible to suppress the phenomenon in which the copper diffused to the band portion is exposed to the surfaces of the external electrodes 130 and 140 and oxidized. In this case, the second and third electrode layers 132, 142, 133, and 143 may be disposed to cover a part of the first and second surfaces of the body 110 as well as cover the band portions 131b and 141b.

A plating layer may be disposed on the third electrode layers 133 and 143, but the plating layer may not be an essential component of the present disclosure. That is, the third electrode layer contains silver (Ag), and even when the third electrode layer is mounted on a substrate, the third electrode layer may be mounted through a conductive adhesive containing silver (Ag) and an epoxy resin, so excellent adhesion strength may be secured without an additional plating layer.

According to an exemplary embodiment, the plating layer may not be disposed on the third electrode layers 133 and 143. That is, the third electrode layers 133 and 143 may be outermost layers of the external electrodes 130 and 140. As a result, it is possible to secure the excellent adhesion strength while miniaturizing the multilayer electronic component 100.

In the case of the multilayer electronic component mounted on a substrate using the conventional a solder containing tin (Sn), there may be a problem in that solder cracks may occur due to a difference in a coefficient of thermal expansion between the solder and the multilayer electronic component.

In an exemplary embodiment, the multilayer electronic component 100 may be mounted on the substrate by bringing the third electrode layers 133 and 143 into contact with the conductive adhesive.

The conductive adhesive may contain silver (Ag) and an epoxy resin. The epoxy resin may be replaced with another resin capable of imparting adhesion.

Since the third electrode layer contains silver (Ag), and the conductive adhesive also contains silver (Ag), the multilayer electronic component may be mounted on the substrate at a relatively lower temperature than when the multilayer electronic component is mounted on the substrate through the solder containing tin (Sn). As a result, it is possible to suppress the occurrence of cracks due to the difference in the coefficient of thermal expansion between the external electrode and the conductive adhesive in a high temperature-low temperature cycle.

Figure 4:
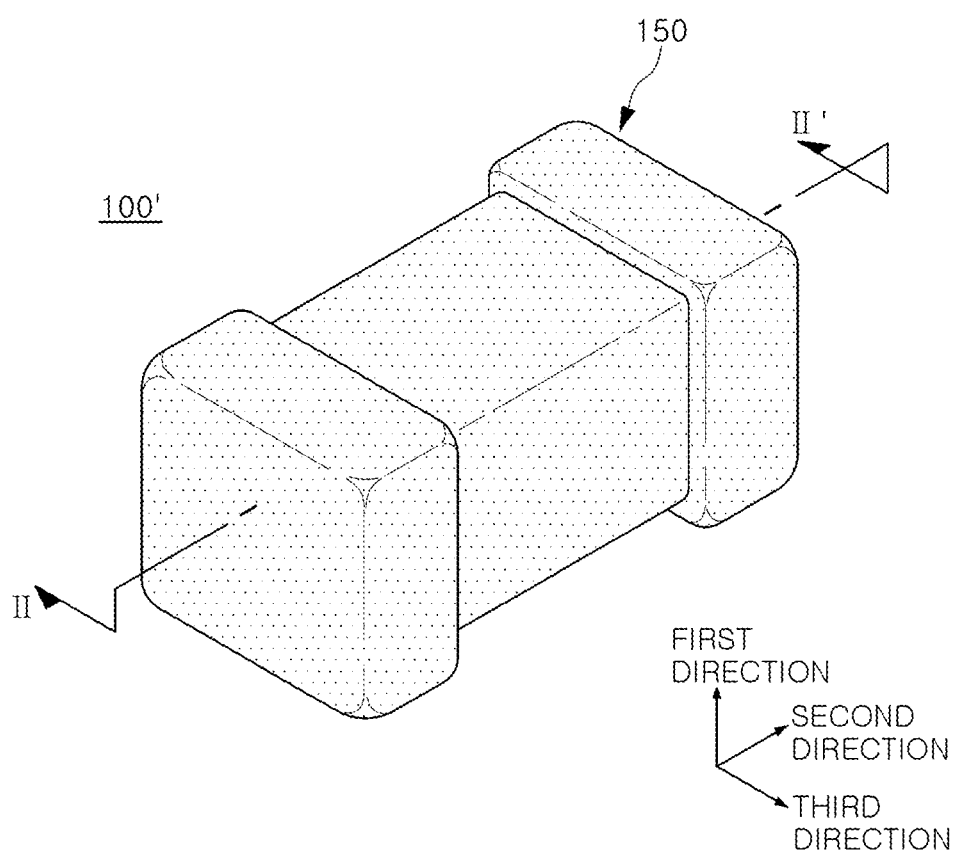
FIG. 4 is a diagram schematically illustrating a perspective view of a multilayer electronic component according to an exemplary embodiment.

FIG. 4 is a diagram schematically illustrating a perspective view of a multilayer electronic component 100' according to an exemplary embodiment.

Figure 5:
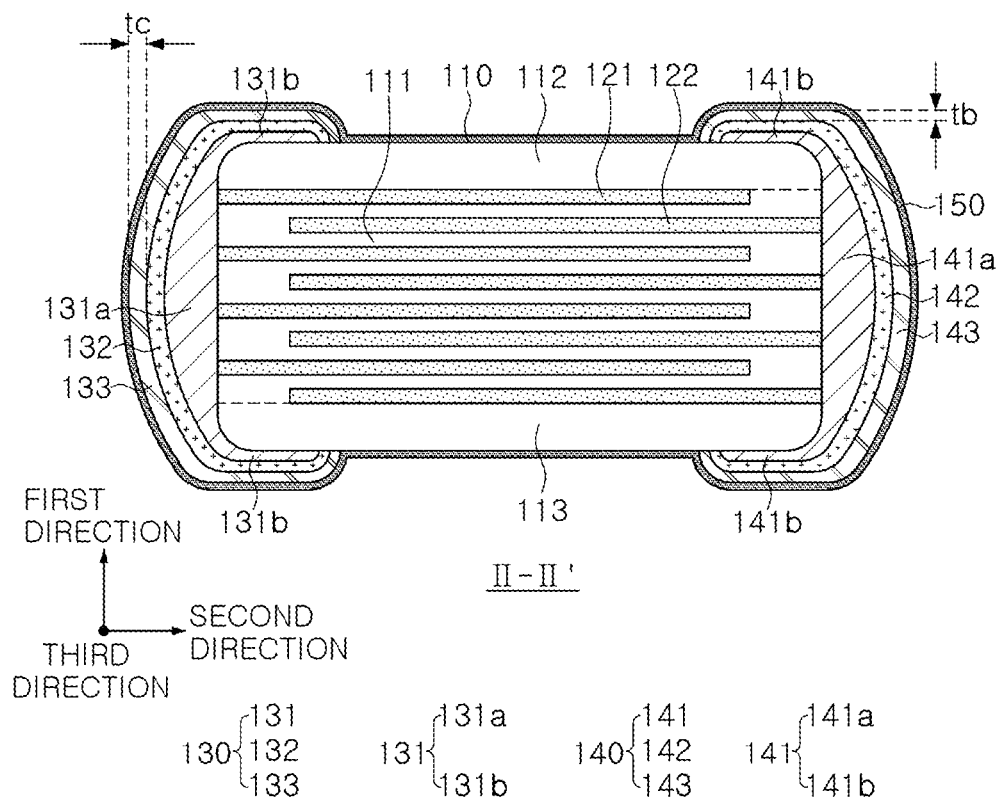
FIG. 5 is a cross-sectional view taken along line II-II' of FIG. 4.

FIG. 5 is a cross-sectional view taken along line II-II' of FIG. 4.

Hereinafter, the multilayer electronic component 100' according to the exemplary embodiment will be described with reference to FIGS. 4 and 5, but the description overlapping with the multilayer electronic component 100 according to the exemplary embodiment will be omitted.

When the third electrode layers 133 and 143 constituting the outermost layers of the external electrodes 130 and 140 contain silver (Ag) or are substantially formed of silver (Ag), an ion migration phenomenon may occur in a high temperature environment, and thus, a short circuit between the external electrodes 130 and 140 may occur, or a short circuit may occur with other electronic components that are mounted on the substrate and are adjacent to the substrate.

Accordingly, in the exemplary embodiment, the ion migration effect may be effectively suppressed by including a coating layer 150 containing at least one of fluorine (F) and silicon (Si) disposed on the outer surface of the multilayer electronic component 100.

In an exemplary embodiment, the coating layer 150 may include a polymer compound containing silicon (Si), and the polymer compound containing silicon (Si) may be a silane-based compound, and a silane coupling agent.

More specifically, the silane coupling agent may be a material having two functional groups having different reactivity in one molecule, that is, a hydrophilic group and a hydrophobic group, and as the silane coupling agent, 3-glycidoxypropyltrimethoxysilane (GPTMS), 3-glycidoxypropyltriethoxysilnae (GPTES), vinyl triethoxysilane, aminopropyltrimethoxysilane (APTMS), and the like may be mainly used, but the type of the silane coupling agent may not be particularly limited thereto. These silane coupling agents may be used alone or in mixture of 2 or more types.

When the coating layer containing the silane coupling agent is disposed on the outer surface of the multilayer electronic component, it is possible to prevent moisture penetration to improve moisture resistance reliability, suppress dissolution of a positive electrode among the external electrodes 130 and 140, and suppress the formation of dendrites on a negative electrode.

However, the components constituting the coating layer 150 may not be limited thereto, and the components that may be contained in the coating layer 150 may be any one or more of a polymer including fluorine (F), an oxide, and a carbide, and may be any one or more of a polymer including silicon (Si), an oxide, and a carbide.

Meanwhile, a thickness of the coating layer 150 may not be particularly limited. However, since the external electrodes 130 and 140 need to adhere to the substrate through a conductive adhesive containing silver (Ag) and an epoxy resin, the external electrodes 130 and 140 may be formed to a sufficiently thin thickness so that the external electrodes 130 and 140 may adhere to the conductive adhesive. However, when the thickness of the coating layer 150 is reduced, the effect of suppressing the occurrence of ion migration may be insufficient.

In an exemplary embodiment, the coating layer 150 may contain silicon (Si), and the content of the silicon (Si) of the coating layer may be 80 wt % or more based on a total weight of the coating layer. Accordingly, when the third electrode layers 133 and 143 contain silver (Ag) or are substantially formed of silver (Ag), the occurrence of the ion migration may be effectively suppressed even when the thickness of the coating layer 150 is formed thinly.

The content of the silicon (Si) contained in the coating layer 150 may be an average value of values calculated by component analysis using the SEM-EDS in any five areas (5 μm×5 μm) of the first surface or the second surface of the body, on the cross section in the length-thickness direction in which the multilayer electronic component is cut from a central portion in the width direction.

In an exemplary embodiment, the multilayer electronic component 100' may be mounted on the substrate by bringing the coating layer 150 into contact with the conductive adhesive.

In this case, the silver (Ag) contained in the conductive adhesive may penetrate into the coating layer and come into contact with the third electrode layers 133 and 143 to secure the electrical conduction, and the epoxy resin contained in the conductive adhesive may serve to increase the adhesion strength through the coupling with the coating layer 150.

Example

Table 1 below showed evaluations obtained by measuring whether Cu is exposed to the surface, ESR characteristics after a temperature cycle, the adhesion strength after the temperature cycle, and capacitance per unit volume, depending on the average thickness of the third electrode layer.

Specifically, whether Cu is exposed to the surface was evaluated as NG when Cu component was measured even in one sample using EDS and OK when Cu component was not measured in all samples, in an image of observing an arbitrary area of the outer surface of the third electrode layer at 10,000 times magnification using a scanning electron microscope (SEM) for 100 multilayer electronic component samples per each test number.

In addition, with the naked eyes, it may be seen that Cu is exposed when protrusions are observed in the sample, and Cu is not exposed when no protrusions are observed.

Regarding the ESR characteristics, the average value of ESR was measured for 100 multilayer electronic component samples per each test number at an alternating voltage of 500 kHZ frequency and 1 kV effective voltage after a temperature cycle of −55° C. to +125° C. (maintained at Min./Max. temperature for 30 min each).

Thereafter, the ESR characteristics were evaluated as NG when the average value of the ESR exceeded 50 mΩ, and as OK when the average value of the ESR was 50 mΩ or less.

Regarding the adhesion strength, the maximum power was measured for 100 multilayer electronic component samples mounted on the substrate per each test number until a deformation of 2 mm or more occurs in a shear test after the temperature cycle of −55° C. to +125° C. (maintained at Min./Max. temperature for 30 min each).

Regarding the average thickness of the third electrode layers 133 and 143, the average value of the sizes in the second direction measured at five points at equal intervals on the third electrode layers disposed on the third or fourth surface of the body was measured by observing the cross section in the length-thickness direction cut from the central portion in the width direction with the scanning electron microscope.

TABLE 1

| Test No. | Average thickness (μm) of third electrode layer | Whether Cu is exposed to surface | ESR characteristics | Adhesion strength (N/mm$^2$) |
| --- | --- | --- | --- | --- |
| 1 | 1 | NG | NG | 5 |
| 2 | 2 | NG | OK | 6 |
| 3 | 3 | OK | OK | 13 |
| 4 | 5 | OK | OK | 15 |
| 5 | 7 | OK | OK | 14 |
| 6 | 9 | OK | OK | 16 |
| 7 | 12 | OK | OK | 15 |
| 8 | 15 | OK | OK | 16 |

TABLE 1-continued

| Test No. | Average thickness (μm) of third electrode layer | Whether Cu is exposed to surface | ESR characteristics | Adhesion strength (N/mm²) |
|---|---|---|---|---|
| 9 | 16 | OK | OK | 14 |
| 10 | 17 | OK | OK | 15 |

Test Nos. 1 and 2 are cases in which the average thickness of the third electrode layers 133 and 143 is less than 3 μm, Cu is exposed to the outer surfaces of the third electrode layers 133 and 143, so it may be checked that the ESR increases and the adhesion strength becomes weak.

Test Nos. 3 to 10 are cases in which the average thickness of the third electrode layers 133 and 143 is 3 μm or more, Cu is not exposed to the outer surfaces of the third electrode layers 133 and 143, so it may be checked that the ESR decreases and the adhesion strength becomes excellent.

Therefore, the multilayer electronic component 100 according to the exemplary embodiment may control the average thickness of the third electrode layers 133 and 143 to 3 μm or more, and thus, may have the excellent adhesion strength and the ESR characteristics. In addition, by controlling the average thickness of the third electrode layer to 15 μm or less, the volume occupied by the external electrode may be reduced, thereby increasing the capacitance of the multilayer electronic component 100 per unit volume.

As set forth above, it is possible to increase adhesion to a substrate by forming an electrode layer formed of Ag on a surface of a second electrode layer containing Ag and Pd to suppress oxidation of Cu on a surface of an external electrode.

In addition, it is possible to suppress oxidation of Cu and facilitate high-capacity design by controlling a thickness of a third electrode layer formed of Ag disposed on an outer surface of a second electrode layer.

Further, it is possible to suppress ion migration that may occur when a third electrode layer formed of Ag is disposed on a surface of a second electrode layer.

However, various and beneficial advantages and effects of the present disclosure are not limited to the above description, and may be more easily understood in the course of describing the specific exemplary embodiments of the present disclosure.

Although the exemplary embodiments have been described in detail above, the present disclosure may not be limited to the above-described embodiments and the accompanying drawings, but is intended to be limited to the appended claims.

Accordingly, various types of substitutions, modifications and changes will be possible by those of ordinary skill in the art without departing from the present disclosure described in the claims, and belong to the scope of the present disclosure.

The term "exemplary embodiment" used herein does not refer to the same exemplary embodiment, and is provided to emphasize a particular feature or characteristic different from that of another exemplary embodiment.

However, exemplary embodiments provided herein are considered to be able to be implemented by being combined with another exemplary embodiment. For example, even if matters described in a particular exemplary embodiment are not described in another exemplary embodiment, these matters may be understood as a description related to another exemplary embodiment, unless an opposite or contradictory description is provided in another exemplary embodiment.

Terms used herein are used only in order to describe an exemplary embodiment rather than limiting the present disclosure. In this case, singular forms include plural forms unless interpreted otherwise in context.

What is claimed is:

1. A multilayer electronic component comprising:
a body including a dielectric layer, first and second internal electrodes, alternately disposed with the dielectric layer interposed therebetween, first and second surfaces opposing each other in a first direction, third and fourth surfaces connected to the first and second surfaces and opposing each other in a second direction, and fifth and sixth surfaces connected to the first to fourth surfaces and opposing each other in a third direction; and
an external electrode disposed on the third or fourth surface of the body,
wherein the external electrode includes:
a first electrode layer connected to the internal electrodes and containing copper (Cu);
a second electrode layer, disposed on the first electrode layer, containing copper (Cu) and silver (Ag), and further containing at least one of palladium (Pd), platinum (Pt), or gold (Au); and
a third electrode layer disposed on the second electrode layer and containing silver (Ag), and
an average thickness of the third electrode layer is 3 μm or more and 15 μm or less.

2. The multilayer electronic component of claim 1, wherein the second electrode layer contains copper (Cu), silver (Ag), and palladium (Pd).

3. The multilayer electronic component of claim 1, wherein the third electrode layer further contains glass, and
a number of moles of silver (Ag) element to a total number of moles of elements constituting the third electrode layer excluding the glass is 0.95 or more.

4. The multilayer electronic component of claim 1, wherein the third electrode layer does not contain glass, and
a number of moles of silver (Ag) element to a total number of moles of elements constituting the third electrode layer is 0.95 or more.

5. The multilayer electronic component of claim 1, further comprising:
a coating layer disposed on an outer surface of the multilayer electronic component and containing at least one of fluorine (F) or silicon (Si).

6. The multilayer electronic component of claim 5, wherein the coating layer includes a polymer compound containing silicon (Si), and the polymer compound containing the silicon (Si) is a silane-based compound.

7. The multilayer electronic component of claim 5, wherein the coating layer contains silicon (Si), and a content of the silicon (Si) of the coating layer is 80 wt % or more based on a total weight of the coating layer.

8. The multilayer electronic component of claim 1, wherein an outer surface of the third electrode layer does not contain Cu.

9. The multilayer electronic component of claim 1, wherein the first electrode layer includes a connection portion disposed on the third surface or the fourth surface and a band portion extending from the connection portion to a part of the first surface or the second surface, and the second and third electrode layers are disposed on the connection portion and extend to the band portion to cover all the band portion.

10. The multilayer electronic component of claim 9, wherein an average thickness of the third electrode layer disposed on the connection portion is greater than that of the third electrode layer disposed on the band portion.

11. The multilayer electronic component of claim 1, wherein the second electrode layer does not contain Ni.

12. The multilayer electronic component of claim 1, wherein a plating layer is not disposed on the third electrode layer.

13. A multilayer electronic component comprising:
a body including a dielectric layer, first and second internal electrodes, alternately disposed with the dielectric layer interposed therebetween; and
an external electrode disposed on a surface of the body, wherein the external electrode includes:
a first electrode layer connected to the internal electrodes and containing copper (Cu);
a second electrode layer, disposed on the first electrode layer and containing silver (Ag); and
a third electrode layer disposed on the second electrode layer and containing silver (Ag);
an average thickness of the third electrode layer is 3 μm or more and 15 μm or less, and
the third electrode layer covers an entire outer surface of the second electrode layer.

14. The multilayer electronic component of claim 13, wherein the second electrode layer further contains a noble metal.

15. The multilayer electronic component of claim 14, wherein the noble metal includes at least one of palladium (Pd), platinum (Pt), or gold (Au).

16. The multilayer electronic component of claim 13, wherein the second electrode layer does not contain Ni.

17. The multilayer electronic component of claim 16, wherein the second electrode layer further contains copper (Cu).

18. A component comprising:
a substrate, and
the multilayer electronic component of claim 13 mounted on the substrate.

19. The component of claim 18, wherein the multilayer electronic component is mounted on the substrate without soldering containing tin (Sn).

20. The component of claim 18, wherein the multilayer electronic component is mounted on the substrate by a conductive adhesive containing silver (Ag).

21. The component of claim 20, wherein the conductive adhesive further contains epoxy resin.

* * * * *